United States Patent Office

2,883,327
Patented Apr. 21, 1959

2,883,327

REDUCING THE GELATION OF METHYLCELLULOSE BY THE ADDITION OF A NEUTRAL, WATER-SOLUBLE, AMINO CARBOXYLIC ACID AND PRODUCT THEREOF

Jack K. Dale, Kalamazoo, Mich., assignor to The Upjohn Company, Kalamazoo, Mich., a corporation of Michigan No Drawing. Application May 3, 1954
Serial No. 427,371

23 Claims. (Cl. 167—82)

This invention relates to compositions of matter and to a process and is particularly directed to compositions of matter and a process in which gelation of methylcellulose is inhibited by means of a neutral, water-soluble amino acid.

The methylcellulose of commerce is a partially depolymerized or hydrolyzed cellulose containing about two methoxyl groups for each glucose unit and having, depending upon the degree of hydrolysis of the cellulose, an average molecular weight of between 30,000 and about 150,000. It is miscible with water in all proportions forming colloidal solutions which vary from thin demulcent liquids to soft gels. The various types are classified commercially according to the viscosity of two percent aqueous solutions which is roughly indicative of the average molecular weight. Thus methylcellulose 15 and methylcellulose 4000 indicate products having a viscosity in two percent aqueous solution of 15 and 4000 centipoises, respectively. Various products of intermediate nature are available.

Methylcellulose has been found to be useful in pharmaceutical preparations. It has been found useful, for example, as a bulk laxative, as a suspending or thickening agent, as a bulking agent in anti-hunger, anti-appetite, and anti-obesity preparations, and as a demulcent in oral preparations for the treatment of ulcers. The suspending and thickening properties of methylcellulose have also made it of value in industrial preparations and processes.

The very property of methylcellulose, however, which makes it highly useful in industrial and pharmaceutical preparations, that is, its property of swelling rapidly in the presence of water to a great bulk, makes it difficult and sometimes hazardous to use. Thus the fact that methylcellulose rapidly wets and swells on contact with water makes it difficult to prepare solutions or suspensions in water, and rather complicated procedures have had to be worked out to prepare such solutions or suspensions. Furthermore, unless some agent is included in such solutions or suspensions to inhibit the swelling or gel formation, pourable solutions of high concentration of methylcellulose cannot be prepared. Also, bulking tablets taken orally have been known to lodge in and to swell in the esophagus with serious results.

It is an object of this invention to provide a process and products in which gelation of methylcellulose is inhibited. Other objects of the invention are to avoid the disadvantages of the prior art. Still further objects will be apparent as the description proceeds.

It has now been found that gelation of methylcellulose is inhibited by incorporating in the water, prior to gelation, a neutral, water-soluble amino acid. By mixing a neutral, water-soluble amino acid with methyl-cellulose, a composition is obtained which wets out more thoroughly than methylcellulose because of the inhibition of gelation and which also, because of the inhibition of gelation, can be made up into pourable suspensions of high concentration. Similarly, by first dissolving the amino acid in water and then mixing in the methylcellulose, good wetting out is obtained and a pourable suspension containing a high concentration of methylcellulose is more readily produced. Thus the amino acid can be incorporated in either the disperse phase (methylcellulose) or the dispersion medium (water).

Prior to the invention, methylcellulose tablets used for bulk laxatives, anti-appetite drugs, etc., had to be swallowed whole since chewing them gave an unpleasant swelling and stickiness between the teeth. Since methylcellulose is slowly soluble, these tablets disintegrated slowly and unpredictably and their maximum benefits were not always obtained. Tablets, according to the invention, on the other hand are pleasant tasting, sweet, and easy to chew, hence are pleasant to take and because they are readily disintegrated, are more rapidly effective and more certain of action.

Also, prior to the invention, the prior art fluid suspension of methylcellulose used sugar to inhibit gelation and, therefore, were not suitable for use by diabetics and others who must avoid sugars. The invention makes possible the preparation of diabetic bulk laxatives containing no sugar. These bulk laxatives can be fluids, tablets, granules, etc. Further, prior to the invention, extemporaneous dry buffered ointment, lotion, suspension and injection vehicles and pharmaceuticals required the use of inorganic salts as the buffering agents. These were somewhat slowly soluble and excessive time was necessary in preparing them for use. With this invention, such vehicles or pharmaceutical preparations are made in a matter of seconds after adding the aqueous fluid. Thus the invention makes it possible effectively to utilize methylcellulose in bulk laxative and antiappetite formulations and as an adjuvant for the preparation and administration of drugs.

In carrying out the process of the invention and in preparing the compositions thereof, any neutral, water-soluble amino acid can be used. By "water-soluble amino acid" is meant those amino acids which are soluble at room temperature in less than 200 parts solvent for each part of amino acid, in other words, amino acids which are soluble in water at room temperature in greater than about 0.5 percent by weight. Suitable amino acids include aminoacetic acid (glycine), methionine, sodium glutamate, alanine, valine, isoleucine, leucine, arginine, cysteine, phenylalanine, histidine, tryptophane, proline, and hydroxyproline, the amino benzoic acids, betaine free base, and the like. All of these amino acids are characterized by having a water-solubility at room temperature of at least about 0.5 percent. Although in the broader aspects of the invention, any amino acid having a water-solubility greater than about 0.5 percent can be used, especially when the amino acid is mixed dry with the methylcellulose, it is of particular advantage to use simple amino acids having relatively high solubility, say, at least two percent and advantageously greater than about five percent by weight. By "simple amino acids" is meant the ordinary alpha amino acids which are capable of polypeptide formation and of existing in the zwitterion state. With such acids, it is possible to prepare a highly concentrated product, whether dry or as a concentrated aqueous suspension, which has a high degree of dilutability.

The amount of amino acid required in the process and compositions of the invention is that amount which will give a concentration of amino acid in the aqueous phase of at least about 0.5 percent. With aqueous solutions containing this concentration of amino acid, methylcellulose is easily wetted to prepare smooth and easily pourable gels. With aqueous solutions containing higher concentrations of amino acids, increased amounts of methylcellulose can be incorporated in the solution as shown in Table I. The data reported in this table was obtained by preparing various concentrations (w./v.) of aminoacetic acid in water (25%, 20%, 16%, 15%, 10%, 7.5%, 5%, 2.5%, 1.25% and 0% water-control) and noting their appearance. Concentrations sixteen percent and below were clear solutions while above were saturated solutions containing undissolved glycine. One-gram samples of methylcellulose of the viscosity noted were placed in fifty-milliliter beakers, ten cubic centimeters of the various glycine solutions or suspensions added, the contents were stirred for two minutes and the final appearance noted. The results are presented in the following table:

TABLE I

EFFECT OF GLYCINE CONCENTRATION ON SWELLING OF METHYLCELLULOSE

| Percent w./v. Glycine in Water | Ratio: Glycine/ Methylcellulose | Appearance with 1 gm. Methylcellulose and 10 cc. Aqueous Glycine |
|---|---|---|
| | | *Methylcellulose 4,000 cps.* |
| >25% | >5/2 | Thin, foamy, unswollen methylcellulose suspension—easily pourable. |
| 25% | 5/2 | Do. |
| 20% | 2/1 | Do. |
| 16% (Saturation) | 8/5 | Thin methylcellulose suspension—easily pourable. |
| 15% | 3/2 | Slightly swollen methylcellulose suspension—easily pourable. |
| 10% | 1/1 | Do. |
| 7.5% | 3/4 | Thixatropic gel—pourable on shaking. |
| 5% | 1/2 | Smooth ointment-like gel—not pourable. |
| 2.5% | 1/4 | Smooth, stiff ointment-like gel—not pourable. |
| 1.25% | 1/8 | Very stiff ointment-like gel—not pourable. |
| 0% (Water Control) | 0/1 | Lumpy, incompletely wetted, very stiff gel—not pourable. |
| | | *Methylcellulose 15 cps.* |
| >16% | >8/5 | Water-thin, unswollen methylcellulose suspension—easily pourable. |
| 16% | 8/5 | Do. |
| 15% | 3/2 | Water-thin, very slightly swollen methylcellulose suspension—easily pourable. |
| 10% | 1/1 | Thin, slightly swollen methylcellulose suspension—easily pourable. |
| 7.5% | 3/4 | Smooth, thin gel-cloudy solution or suspension—easily pourable. |
| 5% | 1/2 | Smooth, thin gel-clear solution—easily pourable. |
| 2.5% | 1/4 | Do. |
| 1.25% | 1/8 | Slightly lumpy, incompletely wetted, thin gel—pourable. |
| 0% (Water Control) | 0/1 | Very lumpy, incompletely wetted gel—pourable. |

The data given in this table show that as little as ten cubic centimeters of 1.25% aqueous glycine wets one gram methylcellulose 4000 centipoises (glycine/methylcellulose ratio=1/8) to give a very stiff non-pourable gel, while if this glycine solution is stirred with methylcellulose 15 centipoises, a thin, pourable, but incompletely wetted (lumpy) gel results. Both viscosities wet completely with 2.5% glycine. In water alone the methylcellulose 4000 forms a lumpy, very stiff, non-pourable gel while methylcellulose 15 centipoises forms a very lumpy but pourable gel. At a glycine/methylcellulose ratio of 1/2 the gel becomes too thick to pour with methylcellulose 4000 centipoises, but pours readily on shaking. At glycine/methylcellulose ratios of 2/1, 5/2 and higher, not all of the glycine is in solution at the volume of liquid used, hence the solution is saturated with glycine which represses the swelling of the methylcellulose so the suspensions are water-thin. Solutions of this type, that is, where all the aminoacetic acid or other amino acid is not in solution, can be diluted with sufficient water to dissolve the undissolved amino acid without causing the methylcellulose to swell. It is possible, therefore, by providing undissolved amino acid in the suspension to substantially increase the concentration of unswollen methylcellulose therein so as to provide concentrated suspensions which can be diluted as required to provide the desired ointment base or gel solution.

That the above effects are not peculiar to glycine are shown by the data given in Table II. These data were obtained by mixing intimately methylcellulose 4000 with the amino acid to be tested in the ratio indicated and subjecting the mixture to the three tests listed. First, the mixture was tasted to see if it swells in the mouth. (If it doesn't swell, it makes a satisfactory oral powder, tablet, etc.) Second, it was added to ten cubic centimeters of water for each gram of methylcellulose with stirring and the appearance observed. (If it is thoroughly wetted and has a nice consistency, it will be suitable for a desiccated ointment, gel etc.) Third, an additional ten cubic centimeters of water was added with stirring and the appearance observed. The results are given in Table II.

From the data given in Table II, it will be seen that widely differing types of amino acids are effective in essentially the same manner as glycine and in essentially the same proportions.

The proportions of amino acid to methylcellulose can be varied widely according to the viscosity of the methylcellulose and the nature and purpose of the composition. Thus with low viscosity methylcellulose, a higher proportion of methylcellulose can be used. Similarly in liquid preparations in which the amino acid is dissolved first, a higher proportion of methylcellulose can be used. Also in ointments and thick gels, a higher proportion of methylcellulose can be used. In general, however, it will be desirable to keep the proportions of methylcellulose to amino acid within the limits of about 1:10 to about 10:1. Within these limits, a wide variety of compositions having a wide variety of different characteristics can be formulated. In formulating dry mixtures and tablets, it is desirable to keep the proportions of methylcellulose to amino acid within the limits of about 2:1 to about 1:4. Within these limits, dry compositions which wet easily are readily obtained. Also within these limits, tablets which can be chewed and swallowed without swelling of methylcellulose can be prepared. A further advantage with the more water-soluble simple amino acids is obtained by using a ratio of methylcellulose to amino acid between

TABLE II

EFFECT OF BETAINE BASE AND dl-METHIONINE ON SWELLING OF METHYLCELLULOSE 4,000 CPS.

| Amino Acid | Ratio-Amino Acid/Methylcellulose | Taste in Mouth | Appearance on Adding Water and Stirring | |
|---|---|---|---|---|
| | | | 10 cc./gm. Methylcellulose | 20 cc./gm. Methylcellulose |
| Betaine Base | 1/2 | OK | Nice ointment-like gel (5% amino acid) | Better ointment-like gel (2.5% amino acid) |
| | 1/1 | OK—Doesn't swell | Nice ointment-like gel (10% amino acid) | Better ointment-like gel (5% amino acid) |
| dl-Methionine | 1/2 | do | Nice firm ointment (5% amino acid) | Slightly thinner ointment (2.5% amino acid) |
| | 1/1 | do | Nice firm ointment (15-30 seconds) (10% amino acid) | Slightly thinner ointment (5% amino acid) | about 2:1 to 1:4, in that ointments formed therefrom can be diluted several times without any substantial decrease in viscosity. As the concentration of amino acid becomes less on dilution, more methylcellulose is hydrated and the viscosity maintained.

The following examples are illustrative of the process and products of the present invention, but are not to be construed as limiting. The parts and percentages are by weight unless otherwise specified.

EXAMPLE 1

Anti-ulcer tablets

These tablets are pleasant to take, easily chewed, antacid tablets containing acid neutralizing agents with the protective coating features of methylcellulose.

Formula: 1,000 Tablets

|  | Oz. | Gr. |
| --- | --- | --- |
| Methylcellulose N.F. 4,000 cps | 5 | 127 |
| Calcium Carbonate Precipitated U.S.P | 12 | 151 |
| Aminoacetic Acid N.F | 5 | 127 |
| Oil Peppermint U.S.P | | 20 |
| Starch Bolted | 1 | 44 |
| Syrup 50% | 2 | 87 |
| Distilled Water | 7 | 307 |
| Alcohol | | 100 |
| Magnesium Stearate Powder | | 100 |

The methylcellulose, calcium carbonate and aminoacetic acid are intimately mixed as powders, then granulated with starch-syrup-water paste and dried carefully at 120 degrees Fahrenheit. The flavor is dissolved in the alcohol, sprayed uniformly on the granules, after which the granules are lubricated with magnesium stearate and compressed on a tablet machine.

If desired, an antisecretory agent can be added, e.g., Pamine (scopolamine methylbromide), two to five milligrams per tablet.

Other antacids can replace the calcium carbonate in the above formula. One of the following, or a combination of two or more, can be used: aluminum hydroxide, aluminum phosphate, aluminum dihydroxyaminoacetate, tribasic calcium phosphate, tribasic magnesium phosphate, magnesium carbonate, magnesium oxide, magnesium hydroxide, magnesium trisilicate, non-toxic anion exchange resin, sodium bicarbonate, etc.

EXAMPLE 2

Bulk laxative tablets

These tablets are pleasant tasting, easily chewed methylcellulose tablets which may be used safely by diabetics and others who need to avoid sugars.

FORMULA: 1,000 TABLETS

|  | Lb. | Oz. | Gr. |
| --- | --- | --- | --- |
| Methylcellulose N.F. 4,000 cps | 1 | 1 | 279 |
| Aminoacetic Acid N.F | | 14 | 48 |
| Sodium N-cyclohexysulfamate | | | 154 |
| Oil Peppermint U.S.P | | | 20 |
| S.D. Alcohol 3A[1] | | 2 | 109 |
| 2% Methylcellulose (15 cps.) Solution | | 2 | 109 |
| Ethyl Alcohol U.S.P | | | 100 |
| Calcium Stearate Powder | | | 200 |

[1] S.D. alcohol 3A is 95.2% volume/volume ethyl alcohol and 4.75% volume/volume methyl alcohol.

The powders, with the exception of the methylcellulose, are mixed and granulated with S.D. alcohol 3A and two percent methylcellulose solution and dried at 120 degrees Fahrenheit (Part I). The flavor is dissolved in the ethyl alcohol and sprayed on Part I granules. The methylcellulose is then added, mixed thoroughly, lubricated with calcium stearate, slugged, screened, and compressed on a tablet machine.

EXAMPLE 3

Bulk laxative tablet fortified

This pleasant-tasting, chewing tablet contains mild laxatives in addition to the bulk producing methylcellulose, hence is more effective when immediate action is desired.

FORMULA: 1,000 TABLETS

|  | Lb. | Oz. |  |
| --- | --- | --- | --- |
| Prune Powder-Methylcellulose (15 cps.) Mixture 50-50 Micronized | | 8 | 358 gr. |
| Aminoacetic Acid N.F | 1 | 1 | 279 gr. |
| Acetophenolisatin | | | 19.3 gr. |
| Citric Acid Powder U.S.P | | | 96 gr. |
| Sodium N-cyclohexylsulfamate | | | 77 gr. |
| S.D. Alcohol 3A | | 5 | |
| 2% Methylcellulose (15 cps.) Solution | | 5 | |
| Methylcellulose N.F. 4,000 cps | | 13 | 100 gr. |
| Calcium Stearate | | | 200 gr. |
| Imitation Flavor | | | 50 min. |
| Alcohol (to dilute flavors) | | | 60 min. |

The prune powder-methylcellulose, aminoacetic acid, acetophenolisatin, citric acid and sodium N-cyclohexylsulfamate is granulated with the S.D. alcohol 3A and two percent methylcellulose. The granules are dried at 120 degrees Fahrenheit and the flavors dissolved in the alcohol, sprayed on, and intimately mixed with the methylcellulose 4000 centipoises. The calcium stearate is then added and slugged, screened, and compressed on a tablet machine.

EXAMPLE 4

Anti-appetite tablet

This product offers an appetite-depressing drug combination with bulk-producing methylcellulose for a sensation of fullness. Each tablet contains:

| | |
| --- | --- |
| d-Amphetamine hydrochloride | mg 1.25 |
| dl-Amphetamine hydrochloride | mg 1.25 |
| Methylcellulose, N.F., 4000 cps | gm 0.5 |
| Aminoacetic acid, N.F | gm 0.4 |
| Sodium N-cyclohexylsulfamate | gm 0.01 |
| Oil peppermint | gr 0.02 |
| Calcium stearate | gr 0.2 |

These tablets are prepared by the procedure of Example 2 using S.D. alcohol 3A, two percent methylcellulose (15 centipoises) solution, and ethyl alcohol in the processing.

Larger amounts up to about 2.5 milligrams per tablet each of d-amphetamine hydrochloride and dl-amphetamine hydrochloride can be used. Also methamphetamine 2.5 to 5 milligrams per tablet can also be substituted for the 1.25 to 2.5 milligrams each of d- and dl-amphetamine.

EXAMPLE 5

Anti-appetite tablet

This product offers an appetite-depressing drug combined with methylcellulose to produce bulk, and an antacid which neutralizes the appetite-stimulating gastric juice liberates carbon dioxide slowly to give a sensation of fullness. Each tablet contains:

| | |
| --- | --- |
| Methamphetamine hydrochloride | mg 2.5 |
| Methylcellulose, N.F., 4000 cps | gm 0.15 |
| Calcium carbonate U.S.P | gm 0.35 |
| Monosodium glutamate | gm 0.15 |
| Oil peppermint | gr 0.02 |
| Starch bolted, q.s. | |
| 2% Methylcellulose (15 cps.) solution, q.s. | |
| Distilled water, q.s. | |
| Alcohol, q.s. | |
| Magnesium stearate powder | gr 0.1 |

These tablets are prepared by the process of Example 1 incorporating methamphetamine intimately with other powders.

Larger amounts up to about five milligrams per tablet of methamphetamine can be used if indicated.

EXAMPLE 6

Pediatric vehicle

This product is a powder which mixed into water provides a flavored, sweetened, thick extemporaneous vehicle suitable for administration of laxative drugs, bitter drugs, insoluble drugs, etc.

FORMULA: (TO BE MIXED WITH WATER AT THE TIME OF USE)

Each jar contains:

| | | |
|---|---|---|
| Methylcellulose, N.F., 4000 cps. | gm | 10 |
| Aminoacetic acid | gm | 5 |
| Sodium N-cyclohexylsulfamate | gm | 0.2 |
| Imitation flavor | cc | 0.06 |
| Alcohol, q.s. | | |

The powders are intimately mixed while spraying in the flavor in alcoholic solution.

On dilution with 80 to 100 cubic centimeters of water, this product gives a pleasantly flavored gel. If diluted further to 120 or 150 cubic centimeters, it makes a nice vehicle for suspending insoluble drugs.

If prepared without flavors and sodium N-cyclohexylsulfamate, it can be used for external lotions and suspensions. Perfume and dyes may be added as desired. Suitably preserved with clinically acceptable antibacterial preservatives (e.g., merthiolate 0.01 percent, benzalkonium chloride 0.02 percent, etc.), this formula without flavors and sodium N-cyclohexylsulfamate makes an injection vehicle which thickens on dilution with plasma.

EXAMPLE 7

*Water-soluble ointments*

This formula offers a buffered water-soluble ointment or ointment base in a dry, stable form which is extemporaneously prepared in a few seconds by addition of water and stirring. Each ointment jar contains:

| | | |
|---|---|---|
| Methylcellulose, N.F., 4000 cps. | gm | 3.4 |
| Aminoacetic acid, N.F. | gm | 1.7 |
| Bacitracin | mg | 150 |
| Neomycin sulfate | mg | 150 |

On adding 25 cubic centimeters of distilled water and stirring, there is obtained one ounce of a smooth ointment which contains five milligrams/gram each of bacitracin and neomycin (pH 6.0). Furthermore, this ointment can be diluted with more water to obtain the desired concentration of antibiotics (i.e., it is still suitable as an ointment when one ounce is diluted up to three to four ounces).

The neomycin and bacitracin can be replaced, in part or in toto, or supplemented by the addition of other drugs such as polymixin B, tyrothricin and other antibiotics, pyridoxine hydrochloride, and hormones such as cortisone and hydrocortisone and the halo derivatives and esters thereof.

The methylcellulose mixture can be sold as a dry ointment vehicle for extemporaneous use by the pharmacist. The ointment forms after ten to twenty seconds, whereas formulas containing sorbitol methylcellulose (U.S. Patent 2,484,637) require thirty to sixty seconds of stirring.

Where it is desirable to obtain the healing effects of dl-methionine, this amino acid can replace all or part of the aminoacetic acid in the above formula. For example, instead of 1.7 grams of aminoacetic acid, one can use a combination of aminoacetic acid, 1.2 grams and dl-methionine 0.5 gram.

Where it is desirable to have a buffered ointment of higher or lower pH value, part or all of the aminoacetic acid may be replaced by glutamic acid, glutamic acid hydrochloride, monosodium glutamate, or other suitable amino acids and derivatives.

EXAMPLE 8

*Diabetic laxative syrup*

This formula offers a laxative fluid containing twenty percent methylcellulose in a pleasantly flavored sweet vehicle. It can be fortified with prune powder and/or acetophenolisatin if desired. Per fluid ounce:

| | Percent, w./v. |
|---|---|
| Methylcellulose, N.F., 100 to 4000 cps. | 20 |
| Aminoacetic acid, N.F. | 16 |
| Tween 85 [1] | 0.01 |
| Preservatives, q.s. | |
| Flavor, q.s. | |
| Distilled water, q.s. | |

[1] Tween 85 is polyoxyethylene sorbitan trioleate.

The aminoacetic acid and Tween 85 are dissolved in the water and methylcellulose added with stirring.

This product pours readily from the bottle and doesn't swell in the mouth although it forms a thick gel on further dilution.

The aminoacetic acid can be reduced to 12.5 percent or possibly ten percent if 0.05 percent Tween 85 is added to the formula, or the amino acetic acid can be partially replaced by glycerine (e.g., 6.25 percent aminoacetic acid and ten percent glycerine).

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. The method of inhibiting the gelation of methylcellulose by water which comprises mixing nonhydrated methylcellulose and a neutral, water-soluble amino carboxylic acid.

2. The method of inhibiting the gelation of methylcellulose by water which comprises mixing nonhydrated methylcellulose and a neutral, water-soluble alpha amino acid in the zwitterion state.

3. The method of claim 2 in which the amino carboxylic acid is aminoacetic acid.

4. The method of inhibiting the gelation of methylcellulose in contact with water which comprises mixing dry, nonhydrated methylcellulose and a dry, neutral amino carboxylic acid having a water-solubility of at least about 0.5 percent at room temperature.

5. The method of inhibiting the gelation of methylcellulose on contact with water which comprises dissolving in the water, prior to gelation of the methylcellulose, at least about 0.5 percent of a neutral, water-soluble aminocarboxylic acid.

6. The process of claim 5 in which the amino acid is a simple alpha amino acid.

7. The process of claim 5 in which the amino acid is amino-acetic acid.

8. The method of inhibiting the gelation of methylcellulose in contact with water which comprises mixing nonhydrated methylcellulose and a neutral, water-soluble amino carboxylic acid in the proportions of 1:10 to 10:1.

9. The method of inhibiting the gelation of methylcellulose in contact with water which comprises mixing in the proportions of about 2:1 to 1:4 dry, nonhydrated methylcellulose and a dry, neutral amino carboxylic acid having a water-solubility of at least about 0.5 percent at room temperature.

10. The process for hydrating methylcellulose which comprises contacting nonhydrated methylcellulose with water containing a neutral, water-soluble amino carboxylic acid.

11. The process of claim 10 in which the amino acid is first dissolved in the water and the methylcellulose then stirred in.

12. The process of claim 10 in which the methylcellulose and the amino acid are contacted with the water simultaneously.

13. The process of hydrating methylcellulose which comprises dispersing nonhydrated methylcellulose in an aqueous solution of a neutral, water-soluble amino carboxylic acid and thereafter diluting the suspension with water.

14. A composition of matter comprising nonhydrated methylcellulose and a neutral, water-soluble amino carboxylic acid.

15. A composition of matter comprising nonhydrated methylcellulose and a neutral, water-soluble amino carboxylic acid in the proportions of 10:1 to 1:10.

16. The composition of claim 15 in which the amino acid is an alpha amino acid in the zwitterion state.

17. The composition of claim 16 in which the amino carboxylic acid is aminoacetic acid.

18. The composition of claim 15 in which the amino acid is aminoacetic acid.

19. A dry composition of matter comprising nonhydrated methylcellulose and a neutral, water-soluble amino carboxylic acid in the proportions of 2:1 to 1:4.

20. An aqueous suspension of at least partially nonhydrated methylcellulose containing at least about two percent of a neutral, water-soluble amino carboxylic acid.

21. An ointment base comprising partially hydrated methylcellulose and a neutral, water-soluble amino carboxylic acid, characterized in that it can be diluted with water without substantial change in viscosity.

22. A compressed tablet containing non-hydrated methylcellulose and neutral, water-soluble amino carboxylic acid, characterized in that it can be chewed without swelling in the mouth.

23. The compressed tablet of claim 22 in which the amino carboxylic acid is aminoacetic acid.

References Cited in the file of this patent

UNITED STATES PATENTS

| | | |
|---|---|---|
| 2,146,873 | Wilmanns | Feb. 14, 1939 |
| 2,588,324 | Lewis | Mar. 4, 1952 |
| 2,798,837 | Sahyun | July 9, 1957 |

OTHER REFERENCES

Brewster: "Organic Chemistry," Prentice Hall, Inc., N.Y., 1948, pp. 404, 405, 410 and 411.

Am. Druggist, Jan. 19, 1953, p. 36.

Obrig.—Arch. of Ophthalmology, November 1947, pp. 668, 674, 675.